United States Patent Office 3,455,619
Patented July 15, 1969

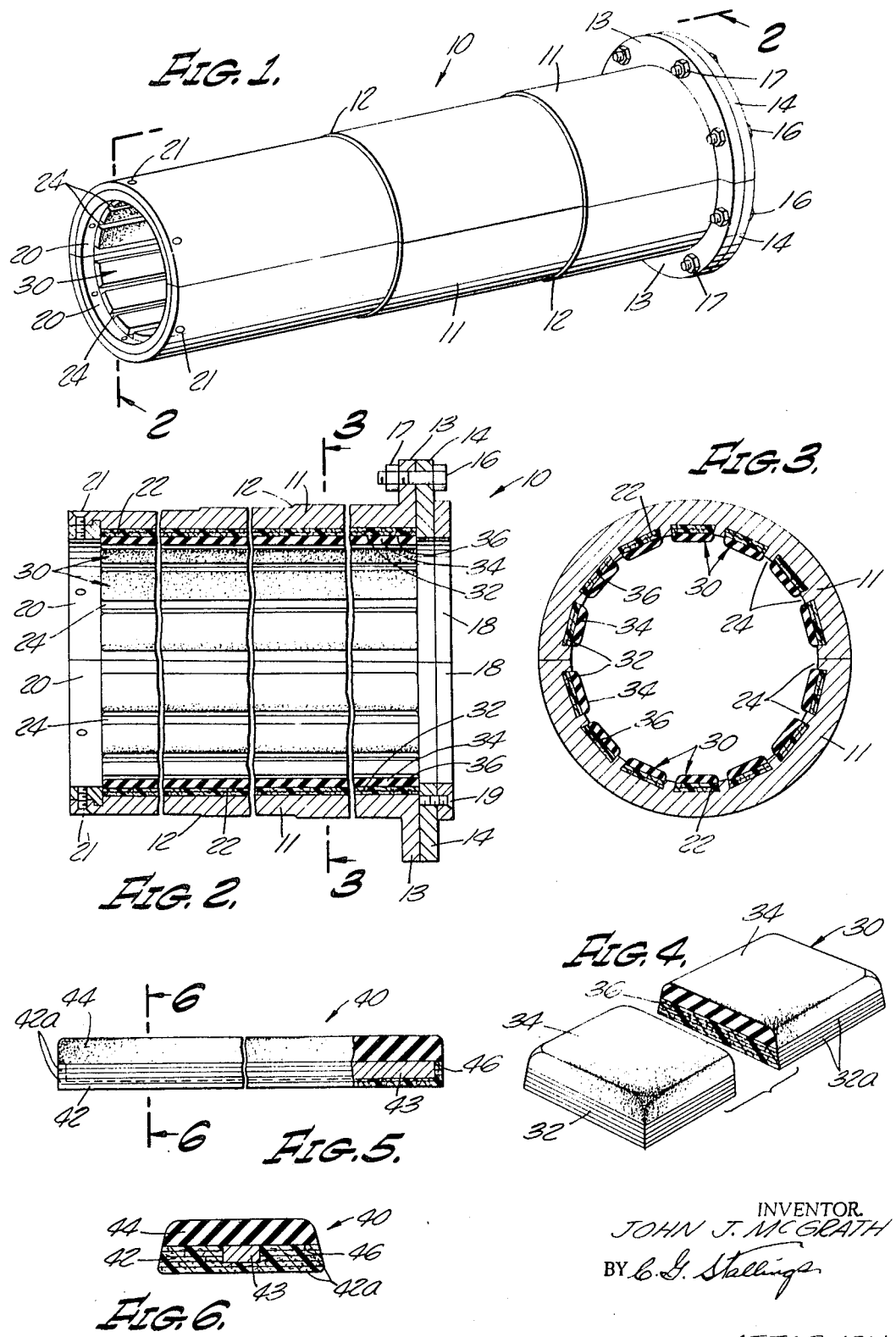

3,455,619
MARINE BEARING STAVE
John J. McGrath, Fullerton, Calif., assignor to Byron Jackson Inc., Long Beach, Calif., a corporation of Delaware
Filed Oct. 11, 1966, Ser. No. 585,909
Int. Cl. F16c 27/06, 33/00
U.S. Cl. 308—238    4 Claims

ABSTRACT OF THE DISCLOSURE

A composite water-lubricated marine bearing stave of tenon or dovetail cross-section which fits into one of a series of internal, longitudinal, circumferentially-spaced, complementary mortise grooves in a bearing support tube of a power driven ship, the bearing face of the stave in supporting contact with the ship's propeller shaft being resilient and elastomeric and lubricated by water in which it is submerged, and the supporting portion of the stave being in engagement with the mortise groove and being of reinforced phenolic material for dimensional stability and strength, the composite stave being non-electrically conductive to avoid electrolysis of adjacent metal ship components submerged in the water.

---

This invention relates to water-lubricated marine bearings, which are used in supporting the rotating propeller shaft of power driven ships, and in particular to the type of bearings using a plurality of longitudinal bearing staves circumferentially spaced in a supporting sleeve or bushing about the propeller shaft. The invention is particularly related to an improvement in these marine bearing staves.

Since water is a natural and excellent surface lubricant for rubber, it has been common practice for many years to make marine bearings for use on propeller shafts, rudder posts, and the like with an inner liner of rubber or related materials against which a shaft turns, there being longitudinal internal grooves or flutes between the bearing surfaces to provide for flow of lubricating and cooling water and efflux of silt, sand, and other abrasive particles.

Electrolysis and corrosion have always been a problem, particularly in salt water and with steel-hull ships, resulting in rusting, deterioration, and binding of the bearing staves in the respective slots or mortises of the bushings, and damage to bearings, supports and other metal parts of the ship's hull. This situation has been prevalent because of the common practice of using staves with a metal supporting-base in metal slots of the marine bearing bushing or tube.

Although wood and other nonconductive materials have been used in stave construction to alleviate the corrosion problem, rubber and similar elastomeric materials are preferable for running against the rotating shaft because of their resilience, shock- and sound-absorbing properties, and ability to yield to reduce the scouring and abrasive effect of sand and other particles which become embedded in the rubber before being flushed out. One effort at alleviating this problem is set forth in United States Patent No. 1,895,936, issued Jan. 31, 1933 to A. B. Merrill, and which shows a composite bearing stave with a hard rubber base and a soft rubber bearing surface, the two bonded together with an adhesive tie-gum layer.

This invention is an improvement over that device and overcomes its shortcomings, the distinct and novel advantages being set forth in this specification.

It is consequently a primary object of this invention to provide a non-conductive marine bearing stave of composite construction and high strength.

Another object of the invention is to provide a marine bearing stave of low electrical conductivity, of composite construction, molded under heat and pressure into a unitary, elongated stave structure of sufficient strength and low brittleness to resist cracking, chipping, or breaking when driven into or out of a complementary groove in a bearing tube.

An additional object of the invention is to provide a marine bearing stave with a supporting plate made up of plies of fibrous material impregnated and bonded together by a thermoset synthetic resin composition, and bonded to an elastomeric and resilient bearing plate under heat and pressure with a mechanical bond or combination mechanical and adhesive bond, thus forming a unitary composite stave with a tough base and a resilient bearing surface.

Another additional object of this invention is to provide a stave for marine bearing use, having a steel reinforcing bar encased between the supporting plate and the bearing plate to provide added strength and regidity.

Still another object of the invention is to provide a non-conductive, non-corrosive marine bearing stave with good dimensional and heat stability, not subject to warpage, shrinkage, expansion, or softening.

Additional advantages and objects will become apparent as the invention is described in further detail below.

Briefly, the invention includes a marine bearing stave made up of an elongated, rigid supporting plate formed of plies of fibrous material impregnated with and bonded together by a thermoset synthetic resin composition, with an elongated bearing plate of cured, resilient elastomeric material bonded to the supporting plate to provide a unitary stave, which is adaptable for driving lengthwise into or out of a complementary groove in a bearing tube or bushing, and a reinforcing bar embedded in the supporting plate and extending for substantially the full length of it.

In the drawings:

FIG. 1 is a perspective view of a stave-type marine bearing assembly, showing a typical installation in a bushing of the staves of the invention;

FIG. 2 is a longitudinal sectional view, taken on the line 2—2 of FIG. 1, on an enlarged scale, and looking in the direction of the arrows;

FIG. 3 is a cross-sectional view, taken on the line 3—3 of FIG. 2, on the same scale, and looking in the direction of the arrows;

FIG. 4 is a perspective view of a stave exemplary of the invention, on a further enlarged scale, with a section cut away;

FIG. 5 is an elevational view, partly in section, of a modified form of stave in accordance with the invention, on the same scale as FIG. 4; and FIG. 6 is a cross-sectional view, taken on the line 6—6 of FIG. 5, and looking in the direction of the arrows.

Like reference characters in the various figures and in the following detailed description designate corresponding parts.

Referring to FIGS. 1, 2 and 3, there is shown a typical flanged stave-type marine bearing assembly 10, which includes a pair of identical complementary halves 11, assembled concentrically, with their flanges 13, aligned, and having bearing staves 30, exemplary of this invention. The bearing 10 illustrates the common practice of stepping down the outer diameter slightly at intervals 12 for easier installation into a correspondingly stepped-diameter bearing support (not shown). On the inner cylindrical surfaces of the bearing half-tubes 11 are formed a plurality of longitudinal mortise grooves 22 of dovetail cross-section, into which fit the staves 30, their supporting plates 32 being of corresponding complementary shape. The staves 30 are restrained from longitudinal movement at the flanged ends of the half-bushings 11 by flange plate retainers 14 fastened to the flanges 13 by means of bolts 16 and nuts 17. To each of the flange plates 14 is screwed an anti-corrosion plate 18, preferably of zinc, screwed on by means of screws 19. The staves 30 are restrained from longitudinal movement at the other or plain end of the half-sleeves 11 by internal stave retainers 20, screwed to the half-sleeves 11 with screws 21. Between the circumferentially-spaced staves 30 are flow channels or flutes 24 through which lubricating and cooling water may enter and flow.

Referring now to FIG. 4, the composite marine bearing stave 30 exemplary of this invention is shown, with its elongated supporting plate 32, made up of plies 32a of fibrous material, such as paper, woven cloth or duck, or woven glass fibers, impregnated and bonded together by a thermoset synthetic resin composition, and the supporting or base plate 32 being mechanically bonded or mechanically and adhesively bonded with a layer of bonding cement 36 to a corresponding elongated bearing plate or pad 34, which is composed of rubber or other elastomeric, rubber-like resilient material with good bearing characteristics.

In FIGS. 5 and 6 is shown a modified form of the invention, a composite marine bearing stave 40, its elongated seupporting plate or base 42, made up of plies 42a of fibrous material, such as paper, woven cloth or duck, or woven glass fibers, impregnated and bonded together with a thermoset synthetic resin composition, and the supporting or base plate 42 being mechanically bonded or mechanically and adhesively bonded with a layer of bonding cement 46 to a corresponding elongated bearing plate or pad 44, which is composed of rubber or other elastomeric, rubber-like resilient material with good bearing characteristics. A reinforcing or stiffening bar 43, preferably of steel, is embedded or encased between the two plates, so that the exposed surfaces of the stave 40 are non-conductive and non-corrosive. The reinforcing bar 43 may also be adhesively bonded to the plates 42 and 44.

In a typical usage of a marine bearing stave 30 of this invention, the components of the stave 30 are molded under heat and pressure into a unitary, composite structure. The elongated base plate or supporting plate 32 is preformed with layers or plies 32a of fibrous sheets, composed of paper, woven cloth or duck, or woven glass fibers, impregnated and bonded together with a thermoset synthetic resin composition, such as phenol formaldehyde. This preformed supporting plate 32 is then placed in a mold with the matching elongated bearing plate 34 of raw rubber, and the components then set or cured under heat and pressure into a unitary composite stave 30. During the molding operation the elastomeric or rubber material of the bearing pad 34, under the heat and pressure, is softened and forced into the interstices of at least one layer or ply 32a of the fibrous plate 32, thus effecting a strong union or mechanical bond between the surfaces of plates 32 and 34, not possible with metal or other non-fibrous supporting plates. This bonding procedure is described in United States Patent No. 3,023,059, issued Feb. 27, 1962 to R. B. Kirk. The bond may be even further enhanced by applying before molding a layer of adhesive cement 36 between the plates 32 and 34, thus providing also an adhesive or chemical bond therebetween. Additionally, the bonding cement 36 also penetrates the interstices or pores of the fibrous plies 32a of the supporting plate 32, thus providing a bond superior to that obtainable with a supporting plate which is not fibrous. An adhesive bonding cement which serves this purpose very well is "Chemlock," made by Lord Manufacturing Company.

The staves 40 are constructed similarly, except that the steel reinforcing bar 43, to which adhesive bonding cement may also be applied, is placed between plates 42 and 44 before molding. Following molding, under heat and pressure, there results a composite bearing stave 40 with the steel reinforcing bar 43 completely embedded or encased within the plates 42 and 44, thus providing a reinforced stave 40 which is electrically non-conductive, precluding any responsibility of electrolysis. In the case of bearing stave 40 also, the mechanical bond formed under heat and pressure between the fibrous material 42 and the rubber 44, may be supplemented by an adhesive or chemical bond by the addition of a layer of bonding cement 46 between the plates 42 and 44 before molding.

Following the molding of the stave bars 30, they are then pushed into the mating grooves 22 of the bearing half-bushings 11, forming a mortise and tenon joint, the phenolic-impregnated fibrous supporting base 32 having sufficient strength and rigidity to retain the staves 30 in the grooves 22, thus resisting their radical or lateral movement in the bearing 10. The end retainers 14 and 20 are screwed in place to retain the staves 30 longitudinally, and the zinc anti-corrosion plates 18 screwed onto the end retainers 14 to reduce the deleterious effect of any electrolytic action. The bearing 10 is put in place, aligned, and secured to the stern tube or bearing support around the propeller shaft of the ship. As water flows through the flutes or channels 24 of the bearing 10, it cools and lubricates the bearing and shaft, and flushes out sand and other abrasive particles which enter the flutes 24 as the propeller rotates, the rubber material 34 being able to yield as the particles pass through between the bearing and the shaft, thus avoiding scouring and abrading of the propeller shaft.

All surfaces of the composite marine bearing stave supporting plates 32 or 42 in contact with the metal grooves 22 being non-metallic and non-conductive, as well as the surfaces of the resilient bearing plates 34 or 44 with the propeller shaft being also non-metallic and non-conductive, the shaft and staves 30 or 40 are thus insulated from the bearing support, and there is no resultant electrolytic corrosion or rusting as with metallic staves, so deterioration and binding are avoided and removal for replacement is facilitated. Also, because of the dimensional stability of the thermoset, resin-reinforced, plied-up fibrous supporting base 32 or 42, there is no distortion, warpage, or swelling as with other non-metallic materials, such as wood or hard rubber, so installation and removal are made easier, and chipping, cracking, and binding due to swelling are avoided.

I claim:
1. A marine bearing stave comprising:
  (a) an elongated, rigid supporting plate formed of plies of fibrous material impregnated with and bonded together by a thermoset synthetic resin composition;
  (b) an elongated bearing plate of cured, resilient elastomeric material bonded to said supporting plate to provide a unitary stave adapted to be driven lengthwise into and out of a complementary groove in a bearing tube; and
  (c) a reinforcing bar embedded in said supporting plate and extending for substantially the full length thereof.

2. A marine bearing stave as defined in claim 1 wherein said reinforcing bar comprises steel.

3. A marine bearing stave as defined in claim 1 wherein said bar is encased within surrounding portions of said stave.

4. A marine bearing stave as defined in claim 1 wherein said bar is adhesively bonded to surrounding portions of said stave.

References Cited

UNITED STATES PATENTS

| | | | |
|---|---|---|---|
| 404,300 | 5/1889 | Perkins | 308—238 X |
| 404,824 | 6/1889 | Clark | 308—238 |
| 1,895,936 | 1/1933 | Merrill | 308—238 |

(Other references on following page)

| | | | |
|---|---|---|---|
| 2,219,054 | 10/1940 | Palm | 308—238 |
| 2,237,316 | 4/1941 | Ruths | 308—238 |
| 2,839,340 | 6/1958 | Merchant | 308—238 |
| 2,943,009 | 6/1960 | Mirsky | 308—238 X |
| 3,023,059 | 2/1962 | Kirk | 308—238 |
| 3,151,015 | 9/1964 | Griffith | 308—238 X |
| 3,349,418 | 10/1967 | Hein | 308—3 X |
| 3,250,556 | 5/1966 | Couch | 308—238 X |

FOREIGN PATENTS 493,304  2/1930  Germany.

MARTIN P. SCHWADRON, Primary Examiner

L. L. JOHNSON, Assistant Examiner

U.S. Cl. X.R.

308—239